INVENTOR
CLARENCE W. HEWLETT, JR.
BY Richard E. Hosley
ATTORNEY

Nov. 11, 1969 C. W. HEWLETT, JR 3,478,347

CONVERTER FOR CONVERTING AN ANGULAR SHAFT POSITION TO A DIGITAL PULSE TRAIN

Filed June 27, 1966 4 Sheets-Sheet 4

3,478,347

CONVERTER FOR CONVERTING AN ANGULAR SHAFT POSITION TO A DIGITAL PULSE TRAIN

Clarence W. Hewlett, Jr., Hampton, N.H., assignor to General Electric Company, a corporation of New York Filed June 27, 1966, Ser. No. 560,763
Int. Cl. H04l *3/00;* H03k *13/00*
U.S. Cl. 340—347 23 Claims

ABSTRACT OF THE DISCLOSURE

A converter which converts output signals from a shaft position indicating means to a plurality of voltage pairs having fixed spaced phase relationships. A particular voltage pair is derived from this plurality of pairs and is converted to produce a pulse train which indicates the shaft position.

This invention generally relates to signal conversion circuits and more particularly to a circuit for converting the output of an angular position sensing means to signals which are easily processed to a train of digital pulses.

With the introduction of computers and other digital devices there has been a great deal of research directed to obtaining means for converting an analog output signal to a signal which can be processed digitally. This research activity has generally produced either electromechanical or electronic conversion means.

In one electromechanical scheme code discs driven by transformer energized motors are rotated in response to a synchro shaft rotation. Whenever the synchro shaft position changes, the transformer energization variation causes motor and code disc rotation to produce a unique pattern of conducting areas on the discs. This pattern is converted to a binary representation by a signal transfer means associated with the discs. In another electromechanical scheme a plurality of synchros are used to obtain fine and coarse readings for accurate position indications.

In one electronic scheme the times for positive zero crossings of a reference voltage and a synchro voltage are compared by means controlling a pulse generator. The time interval between zero crossings indicates the position of the synchro shaft. In another system a network provides a plurality of trigonometric functions which represent the position of the synchro by means of a plurality of synchros and flip-flop circuits. Still another electronic system utilizes oscillators to start clock trains and compare an analog voltage and an oscillator voltage to shut off the clock train at a particular point in time. In still another system the space phase between a reference and a synchro voltage is converted to a single time phase signal by means of amplifier and differentiation circuits to control clock gates. Other schemes have included initial conditioning of the synchro signals and nulling a conditioned synchro signal with a reference signal.

Each of the systems in the prior art have required complex electronic circuitry or have included electromechanical devices. Furthermore these conversion systems have generally been directed to the particular class of synchro devices which are energized by fundamental frequencies and hence have been either non-operable or inaccurate when conversion of the output signals from that class of synchro devices known as second harmonic selsyn transmitters is required.

As will be made evident during the discussion and description of this system, the output signals from any synchro device can be converted by making minor changes in the circuitry of the illustrated embodiment of this invention. However, this invention has primary application in the field of second harmonic selsyn systems wherein a stator is energized by a fundamental frequency and a rotor is constituted by a permanent magnet which maintains a relatively stationary position during operation.

In order to thoroughly understand this invention, it will be helpful to review the basic operation of a second harmonic selsyn system as this analysis also will serve as a general background for the understanding of other systems. In one common application of second harmonic selsyn systems it is desired to repeat the position of a synchro shaft at a remote location. Such a second harmonic selsyn system is constituted by a transmitter which produces a signal indicative of shaft position which is transferred to a second, remotely located selysn called a receiver. If permanent magnet rotors are associated with the transmitter and receiver, the position of the rotor with respect to the stator of the transmitter selysn produces a unique pattern of voltages on the stator when the stator is energized by a voltage of a fundamental frequency. However, as the permanent magnet rotates and changes he saturation pattern of the stator core, a second harmonic output is developed and superimposed on the fundamental. The unique voltage pattern across the stator coil may be derived by tapping at three equiangular positions on the stator coil with a first position representing the energizing point of the coil. The receiver selysn stator is energized in parallel with the transmitter stator and like taps on the stators are connected together. This interconnection of the two selysn stators causes an identical voltage pattern to be produced on the receiver stator as is produced by the transmitter stator. If a magnet is associated with the receiver stator, it assumes the same angular position as the transmitter rotor.

Although these devices are useful in combination to indicate the position of the transmitter rotor at the remotely located receiver, the combination of the fundamental and second harmonic voltages produces a voltage wave shape which is difficult to use in other devices as is well known in the art. One particular use of such transmitters in which a digital output is desirable is in the field of mass flow meters because the rotor can be located in a flow path and still produce an output voltage on a stator coil isolated from the flow. This eliminates the need for electrical connections to elements within the flow path.

It is a general object of this invention to provide a signal conversion means capable of converting the angular position of a shaft to another signal form.

Another object of this invention is to provide a signal conversion means capable of converting signals from synchro transmitters to another signal form.

Still another object of this invention is to provide a synchro-to-digital converter capable of converting a signal from a synchro transmitter to a digital pulse output.

Yet another object of this invention is to provide a synchro-to-digital converter capable of converting a signal from a second harmonic selsyn transmitter to a digital pulse output.

In substance, apparatus constructed in accordance with this invention converts output signals from a shaft position indicating means to a plurality of voltage pairs having fixed spaced phase relationships, derives a particular voltage pair and manipulates the selected pair to obtain a trigonometric function which, in combination with another signal indicating which voltage pair was selected, linearly represents the shaft position.

More specifically, the synchro shaft is arbitrarily divided into a number of angular sectors. Voltages produced on the stator as a function of rotar position are transformed into a pair of voltages having a fixed space phase relationship for any given sector of rotor position and magnitudes which vary independently as a function of the rotor position.

Sector sensing means are provided for producing a first series of pulses up to a predetermined maximum in a given time interval which represents the sector in which the rotor is located. The magnitudes of the two vector voltages are converted to produce a second series of pulses which indicate the rotor position within the sector. In addition, these vector voltages are compared to control the sector sensing means and cause the sector to be changed to an adjacent sector when the rotor moves to such an adjacent sector. Both the first and second pulse series are summed in the given time interval and can be coupled to an integrating, readout or other digital device to produce a useful output.

The invention has been clearly pointed out in the appended claims. These and further objects and advantages of a signal conversion circuit utilizing this invention can be better understood by reference to the following detailed description considered in connection with the accompanying drawings in which like reference numerals designate like parts throughout and wherein:

Figure 1:
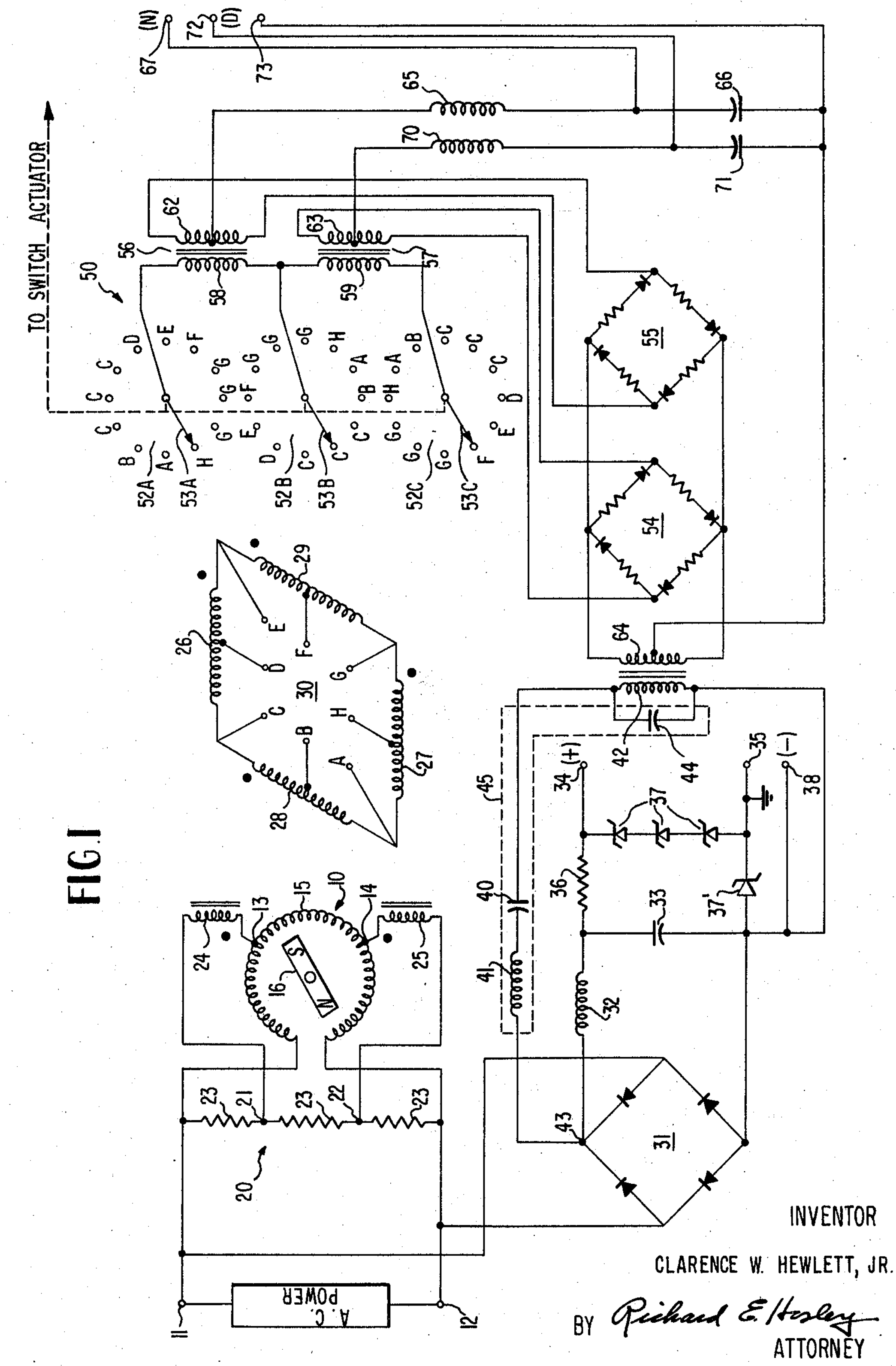
FIGURE 1 illustrates a system for converting signals from a second harmonic selsyn transmitter to signals capable of being converted to digital signals.

A second harmonic selsyn transmitter of the class described is designated by numeral 10 in FIGURE 1. Generally transmitter 10 includes terminals 11 and 12 adapted to be connected to an alternating current energy source, taps 13 and 14 on a stator 15 and a permanent magnet rotor 16.

Although an output voltage from this class of synchros is characterized by a peculiar wave shape, the effect of the fundamental on the wave shape is substantially eliminated by connecting a voltage divider 20 between terminals 11 and 12 so that a tap 21 and a tap 22 are provided to divide the energizing fundamental voltage into thirds. Although the voltage divider 20 is shown as comprising three resistors 23 in series, it will be obvious to those skilled in the art that other voltage division means can be utilized. As the fundamental voltage also divides equally across stator 15, the net fundamental voltage between tap 13 and tap 21 is zero. Similarly, the net voltage is zero between tap 14 and tap 22. Therefore, the major signal component across tap 21 and tap 13 is the second harmonic which energizes a first transformer primary 24. A second transformer primary 25 is also connected between taps 14 and 22; and both the primaries 24 and 25 are poled as shown. Therefore, the voltages appearing across the transformer primaries 24 and 25 vary substantially as the second harmonic, are out of space phase by 60° or 120° and provide a unique voltage pattern for each position of the rotor 16.

Although the transmitter 10 is shown as being modified for use as a second harmonic selsyn transmitter, if other synchro devices are utilized which produce a fundamental harmonic only, then the manner of energizing the pair of transformer primaries can be modified. In such a modification, the voltage divider would be eliminated; and each transformer primary would be connected individually between two of the stator coil taps normally associated with such synchro devices when this connection scheme is used, the voltages across the transformer primaries vary substantially as the fundamental.

Referring again to FIGURE 1 primary 24 has two secondaries 26 and 27 inductively coupled thereto while a similar secondaries 28 and 29 are associated with transformer primary 25. By connecting the transformer secondaries 26, 27, 28 and 29 in a rhombic configuration 30 and poling the secondaries as shown, the net voltage around the loop is zero and there are no circulating currents. Each transformer secondary is center tapped so that a plurality of terminals, A through H, are formed at the center taps and connecting points for the secondaries. The angle CAG is 60° for purposes to be explained hereinafter.

Also connected to the terminals 11 and 12 is a power supply which includes a full-wave bridge rectifier 31, the output of which is filtered by a choke 32 and a capacitor 33. The voltage output at terminal 34 and grounded terminal 35 should be regulated by any of the known regulating circuits. In the particular embodiment shown, a Zener diode regulating circuit, including a resistor 36 and a plurality of Zener diodes 37 is used, the terminal 34 being connected to the junction formed by resistor 36 and the Zener diode network. Another Zener diode 37' connects the grounded terminal 35 to bridge rectifier 30 so that a negative terminal 38 is provided.

A circuit comprising a capacitor 40, a coil 41, and a transformer primary 42 is connected in series between terminal 38 and a junction 43, formed by one of the output terminals of the full-wave bridge rectifier circuit 31, and choke 32; and a capacitor 44 is connected in parallel with transformer 42. The capacitor 40 couples the ripple frequency alternating current to the transformer primary 42 while blocking direct current therefrom. Furthermore, the capacitors 40 and 44, the coil 41 and the transformer primary 42 constitute a phase shift network which alters the time phase of the ripple frequency from the rectifier 31. The phase shift network, shown in outline and designated by numeral 45; is well known in the art; and it will be obvious that other phase shift networks could be substituted therefor.

Sets of voltage pairs are chosen from the voltages on the transformer secondaries 26, 27, 28 and 29 by a sequential switching means 50. Switching means 50 is shown diagrammatically in FIGURE 1 as being constituted by three poles of a four-pole, twelve-position rotary switch for purposes of simplicity in the discussion. However, electronic switching means can be utilized to perform this switching function. Each pole, designated 52A, 52B and 52C, includes a plurality of circuit closing means designated by a plurality of contacts and a wiper arm; the wiper arms are denoted 53A, 53B and 53C. Each contact is designated by a letter A through H which corresponds with a particular connection point on the rhombic configuration 30. In the position shown, the wiper arm 53A is connected to the terminal H; the wiper arm 53B, to the terminal C; and the wiper arm 53C, to the terminal F. As the wiper arms are moved around the switch together, a plurality of voltage pairs are derived for each position of the switching means 50 as shown in FIGURE 2.

Figure 2:
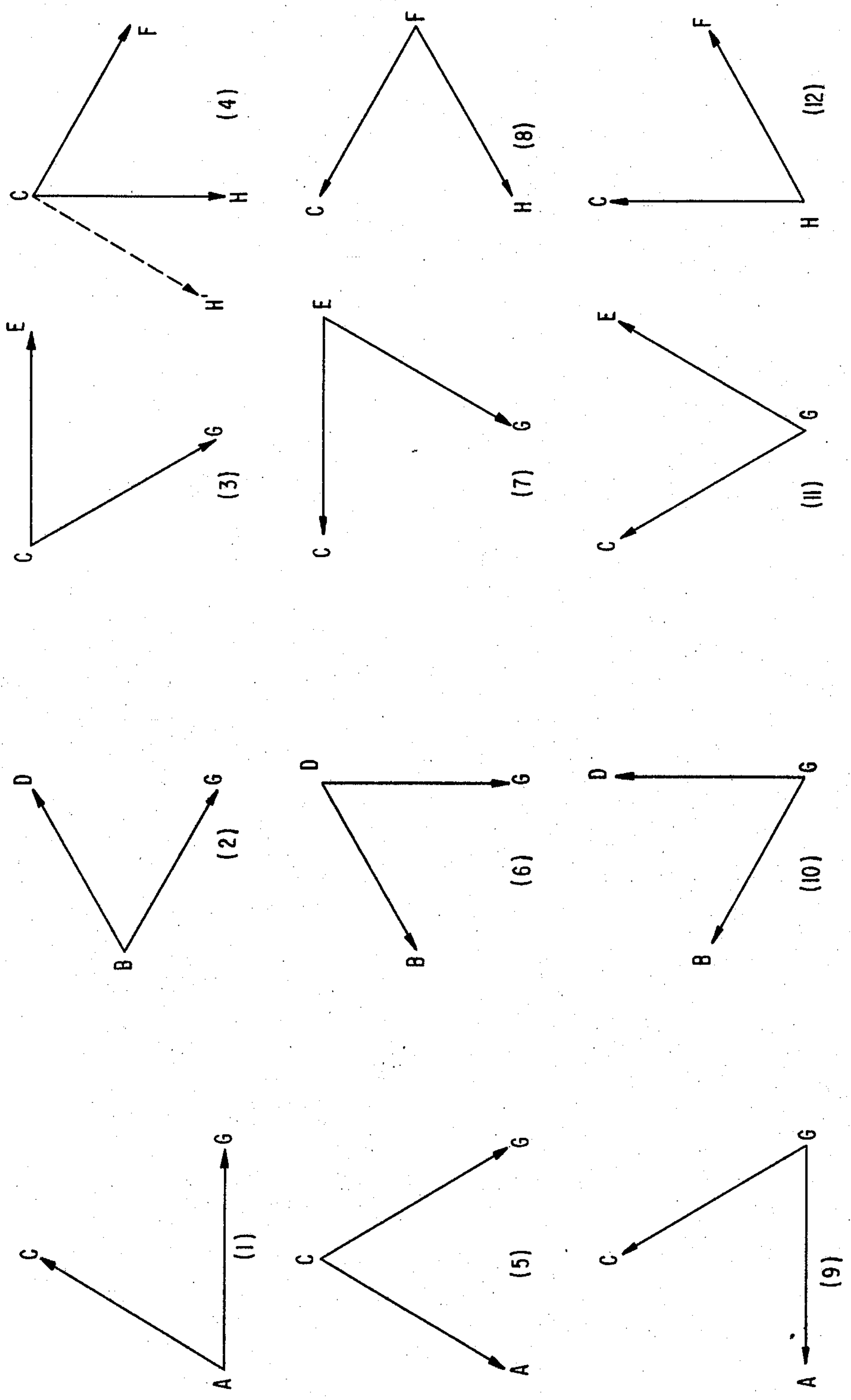
FIGURE 2 illustrates diagrams of the various voltage pairs produced by the circuit in FIGURE 1.

Referring now to FIGURE 2 the voltage pairs derived from the voltages on the transformer secondaries by the switching means 50 shift 30° in space phase clockwise as switching means 50 advances clockwise through the twelve positions in sequence. Although the individual voltages constituting the various voltage pairs remain in a fixed space phase relationship at any given position of the switching means 50, the vector magnitudes vary as a function of rotor position. As a result of the particular rhombic configuration 30 shown in FIGURE 1, the voltages in position (3) each have a nominal unit magnitude for a given position of the rotor within the sector, for example vector $\overline{CE}$ has a unit length; however, in position (4) the vector $\overline{CF}$ has a length of 0.866 unit. Similarly, the same relationship exists between the vectors $\overline{CG}$ and $\overline{CH}$ in positions (3) and (4). Complete analysis of the voltages, shown vectorially in FIGURE 2, reveals that in addition to moving 30° in each position, the vector pairs alternately move from a nominal unit length to a length of 0.866 unit. This relationship of the vector pairs is caused by connections between the terminals of the rhombic secondary 30 and the switching means 50. Hence, the rhomic secondary 30 and the switching means 50 serve to divide the stator 15 into twelve 30° sectors which are indicated by the position of switching means 50; and furthermore the voltage relationship between each voltage of the voltage pair for a given sector is dependent upon the position of the rotor 16.

In order to convert the voltage pairs to a useful output which appears as a pair of varying D-C voltages, demodulator circuits 54 and 55 and a pair of transformers 56 and 57 are used to compare each of the voltages with a reference voltage as shown in FIGURE 1. Transformer 56 has a primary 58 connected to wipers 53A and 53B while a primary 59 of the transformer 57 is connected between wipers 53B and 53C. Center-tapped secondaries 62 and 63 provide one input voltage for each of the demodulator circuits 55 and 54, respectively. The other voltage for each demodulator is supplied from a center-tapped secondary 64 energized by the primary 42. The phase shift network 45 in the primary circuit is chosen so that the reference voltage appearing across the secondary 64 and the voltages across the secondaries 62 and 63 are in time phase. By applying voltages from the secondaries 62, 63 and 64 to the demodulators 55 and 54 respectively, varying D-C voltages appear between the center tap of the secondary 64 and each of the center taps on the secondaries 62 and 63 which are proportional to the magnitude of the individual voltages of the derived voltage pair. One D-C voltage is coupled from the secondary 62 by connecting an inductor 65 and a capacitor 66 in series between the center taps of the secondaries 62 and 64 with a negative output connection 67 being formed at the junction of the inductor 65 and the capacitor 66. A similar inductor 70 and capacitor 71 are connected in series between the center taps of secondaries 63 and 64 to form another negative output junction 72. The center tap of the secondary 64 constitutes a common junction 73.

When the switching means 50 is in position (4) as shown in FIGURE 1, the D-C voltage which appears between terminals 67 and 73 varies as the magnitude of a vector $\overline{CH}$ while the voltage across terminals 72 and 73 varies as the magnitude of a vector $\overline{CF}$. Both of these vectors are shown in FIGURE 2 and for purposes of subsequent discussion, the voltage between terminals 67 and 73 is designated as the N voltage while the voltage between terminals 72 and 73 is designated as the D voltage.

The reasons for choosing the rhombic secondary 30 will now be explained in connection with the assumptions which have been made. Although the voltages appearing across the primaries 24 and 25 are either 60° or 120° out of space phase, they are in the same time phase. Furthermore, the magnitudes of the voltages in the primaries 24 and 25 vary sinusoidally as the rotor 16 is rotated.

In a given sector, the sine of the angle of magnet rotation could be obtained merely by using a vector $\overline{CH}'$ shown in FIGURE 2 at position (4). Although a sine wave is substantially linear for ±15° of zero, errors, introduced in actual operation by energizing voltage variations, would cause vector magnitude changes which would be unacceptable. If another vector, displaced in phase by 90° from the vector $\overline{CH}'$ (e.g., the vector $\overline{CF}$) were also obtained, it would vary as the cosine of the angle subtended by the magnet. If the magnitude of the vector $\overline{CH}'$ were divided by the magnitude of the vector $\overline{CF}$, the resultant signal would vary as the tangent of the angle and would produce one desirable result. As a voltage ratio would be taken, energizing voltage changes cause like variations in both the N and D voltages so that the net change of the tangent would be zero.

However, the sine value changes sign over a range of ±15°. In accordance with this invention, the sign is always of a single polarity because the vector $\overline{CH}$ is used rather than the vector $\overline{CH}'$ so that the vectors in the voltage pair are displaced by 60° in space phase. Letting $\theta$=the angle the magnet makes with a zero point in a given sector, then (1) $|\overline{CF}|=V\cos\theta$, and
(2) $|\overline{CH}|=V\sin(\theta+30°)$, or
(3) $N=kV\sin(\theta+30°)$, and
(4) $D=kV\cos\theta$ where $k$ is a proportionality constant determined by the transformer turns ratio and any other attenuation factors present in the circuit. Assume that the division of the N voltage by the D voltage produces a voltage V′, then (5) $V'=N/D=\sin(\theta+30°)/\cos\theta$.

However, (6) $\sin(\theta+30°)=(\sin\theta\cos 30°)+(\sin 30°\cos\theta)$, and if Equation 6 is substituted in Equation 5, (7) $V'=(\cos 30°\tan\theta)+(\sin 30°)$, or
(8) $V'=(\sqrt{3}\tan\theta/2)+\frac{1}{2}$ If $\theta$ does not become more negative than (−30°), the values of V′, N and D are always of the same polarity. As the stator is divided into 30° sectors, the (−30°) value is not exceeded; and this permits the design of the divider circuit to be simplified as it must sense a signal of only one polarity.

Figure 3:
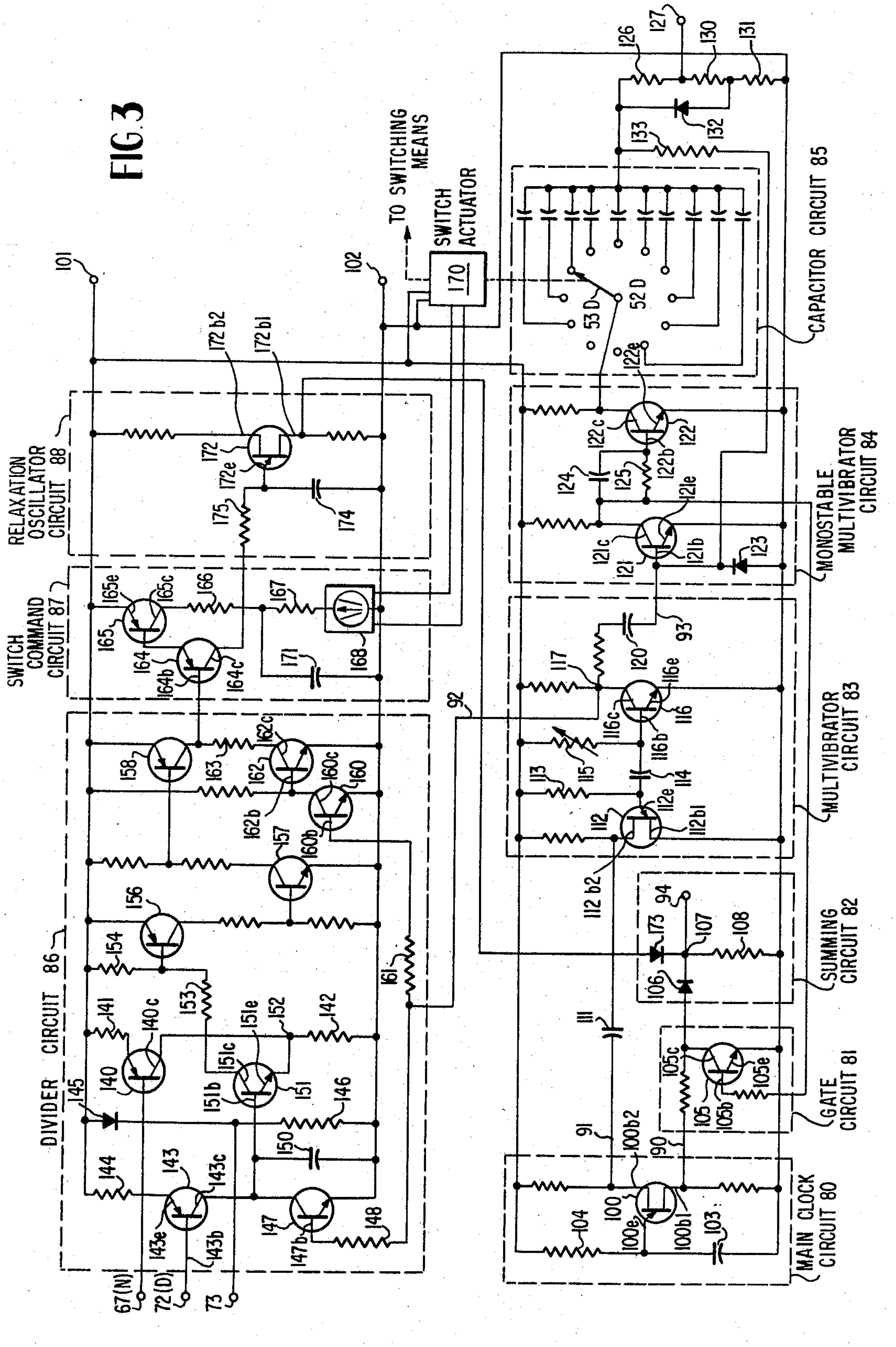
FIGURE 3 illustrates circuitry energized by the output signals produced by the circuit in FIGURE 1 to produce the digital output pulses.

By utilizing the rhombic secondary 30 shown in FIGURE 1 and the switching means 50 and demodulators 54 and 55 in FIGURE 3, the two D-C voltages at terminals 67, 72 and 73 are in a ratio which determines whether the proper voltage pair has been derived by the switching means 50. If the proper voltage pair are derived, the ratio magnitude provides a substantially linear time interval indication of the position of rotor 16 within the sector which can be manipulated to provide a digital output.

If a synchro producing a fundamental voltage is utilized, modifications must be made to the circuit energizing the transformer primary 42 so that only a fundamental wave form is obtained. To effect such a conversion, the phase shift network 45, the transformer primary 42 and the capacitor 44 could be disconnected at the junctions 43 and the terminals 38 and connected directly to terminals 11 and 12. In addition, the transformer primaries 24 and 25 would be connected directly to the taps rather than the voltage divider taps 21 and 22. With these changes the voltages at terminals 67, 72 and 73 would be varying D-C voltages having the relationship as described hereinabove.

The detailed circuitry shown in FIGURE 3 is adapted to be energized by the N and D voltage signals at terminals 67, 72 and 73 and to convert them to a digital output pulse train. In order to fully understand the operation of this circuitry, the various functions of the individual circuits outlined in FIGURE 3 wll be discussed and then a detailed discussion of the circuit operation of the particular circuits shown will be presented.

Basically the circuit shown in FIGURE 3 comprises a first pulse generating means constituted by a main clock circuit 80, a gate circuit 81, a pulse summing means such as a summing circuit 82, a free-running astable asymmetrical multivibrator circuit 83, a monostable multivibrator circuit 84, a capacitor circuit 85, a divider circuit 86, a switch command circuit 87 and a second pulse generating means such as a relaxation oscillator circuit 88. As will become obvious during the discussion of these individual sections and the particular details shown, each individual circuit can be constituted by other known and equivalent detailed circuit elements with the same results.

Clock pulses from the main clock circuit 80 are coupled to the gate circuit 81 by a conductor 90 and to the multivibrator circuit 83 by a conductor 91 to synchronize its operation. The multivibrator circuit 83 is constructed so that a signal appears on a conductor 92 for most of a predetermined time interval; this time interval is dependent upon the construction of the multivibrator circuit 83 and is defined in terms of a number of pulses from the main clock circuit 80 applied thereto. The multivibrator circuit 83 controls the monostable multivibrator circuit 84 and the divider circuit 86. When the monostable multivibrator circuit 84 is energized by the multivibrator circuit 83, the gate circuit 81 opens for a predetermined period of time as determined by the capacitor circuit 85, and the value of capacitor circuit 85 is determined by the position of the switching means 50 shown in FIGURE 1. Therefore, for a given sector of the circle the monostable multivibrator circuit 84 opens gate circuit 81 for a particular length of time to permit pulses from main clock circuit 80 to pass therethrough to the summing circuit 82.

In the circuit shown in FIGURES 1 and 3, the magnet rotor 16 does not normally traverse the entire circle; therefore a limited number of switch elements are used in the capacitor circuit 85. In the particular converter shown, the predetermined time interval is defined by twelve pulses so that a cycle of operation for the multivibrator circuit 83 is also twelve pulses. However, as less than twelve positions are used, the longest period for which monostable multivibrator circuit 84 remains in its astable state is the time for the main clock circuit 80 to produce a given number of pulses less than 12. In this embodiment, only eleven positions are used, and the maximum time period for which the monostable multivibrator circuit 84 remains in the astable state is the time required to permit ten pulses from main clock 80 to pass through the gate circuit 81. Therefore, the eleventh and twelfth pulses from main clock circuit 80 in a given time interval are not coupled to summing circuit 82 under any circumstances. This leaves an unused portion of the given time interval during which addition pulses may be added to the digital pulse train by a relaxation oscillator 88 which is coupled to summing circuit 82.

On the eleventh pulse the divider circuit 86 is actuated by the multivibrator circuit 83 to produce an output signal which represents the division of the numerator (N) voltage by the denominator (D) voltage. This resulting division signal is coupled to both the switch command circuit 87 and the relaxation oscillator circuit 88. The relaxation oscillator 88 includes a memory element and produces a pulse output in response to the value of the *N/D* signal which is delivered to the summing circuit 82 during the suppression of the eleventh and twelfth pulses. In particular the relaxation oscillator 88 may produce a pulse output of 0, 1 or 2 pulses during the eleventh and twelfth pulse intervals which is coupled to the summing circuit 82. Therefore, during each given time interval, a signal appears at output terminal 94 which comprises a first train of pulses representing the sector in which the rotor 16 is located and a second train of pulses indicating the position of the rotor 16 within the sector. These pulses can then be scanned by any known digital device to average the first and second trains over a plurality of time intervals and thereby obtain an average count which is indicative of the position of the rotor 16.

If the rotor 16 leaves a particular sector as defined by switching means 50, the magnitude of the *N/D* signal reaches a maximum or minimum level determined by the linear time interval signal. The switch command circuit 87 senses the maximum or minimum level and causes the switching means 50 to shift sequentially one position so as to return the *N/D* signal magnitude to an acceptable level. In order to obviate hunting of the switching means, overlap is provided. For example, if position (3) represents a rotor space angle from 60° to 95°, position (4) could represent rotor angles from 90° to 125°.

In order to understand details of the circuit and its operation each circuit will now be explained in detail with reference to FIGURES 1 through 4 with particular emphasis being placed on FIGURE 3. In this discussion the electrodes of individual components are given an alphanumerical designation; the numerals represent a numerical designation of the component and the letter suffix designates a particular electrode. For example, the emitter electrode of a unijunction transistor 100 would be designated as "emitter 100*e*."

MAIN CLOCK CIRCUIT 80, GATE CIRCUIT 81 AND SUMMING CIRCUIT 82

The main clock circuit 80 comprises a standard unijunction transitsor oscillator including a unijunction transistor (UJT) 100 having both bases 100*b*1 and 100*b*2 resistively coupled to power supply terminals 101 and 102 which can be connected to terminal 34 and grounded terminal 35 shown in FIGURE 1. In such a configuration, the regulated voltage at terminals 101 and 102 energizes an RC timing circuit including capacitor 103 and resistor 104. The emitter 100*e* is connected to the junction of capacitor 103 and the resistor 104 to complete the circuit. An output is taken from each base of UJT 100 with the output on the first base 100*b*1 being resistively coupled to gate circuit 81.

Gate circuit 81 comprises a transistor, shown as an NPN transistor 105, having a collector 105*c* connected to the output of main clock circuit 80 and an emitter 105*e* connected to ground. When the transistor 105 conducts, pulses from the main clock circuit 80 are shunted to ground; but when the transistor 105 is nonconductive, pulses are coupled through a diode 106 in the summing circuit 82 to a summing junction 107 and a summing resistor 108. Negative-going pulses which appear at base 100*b*2 and on the conductor 91 when the UJT 100 fires are coupled through a capacitor 111 to the multivibrator circuit 83.

MULTIVIBRATOR CIRCUIT 83

The multivibrator circuit 83 includes a UJT 112 having its first base 112*b*1 grounded while its second base 100*b*2 is resistively coupled to the terminal 101. The emitter 112*e* is also resistively coupled to terminal 101 by resistor 113 and by an RC circuit comprising a capacitor 114 and a variable resistor 115. An NPN transistor 116 has a base 116*b* connected to a junction formed between the capacitor 114 and the variable resistor 115; and the collector 116*c* is resistively coupled to terminal 101 while the emitter 116*e* is grounded. This circuit configuration produces free-running, asymmetrical multivibrator.

When the transistor 116 conducts, the base 116*b* is at substantially zero potential, and the resistor 113, the capacitor 114 and the variable resistor 115 effectively constitute a firing circuit for the UJT 112. The time interval required for charging the capacitor 114 to the peak point emitter voltage is primarily determined by its value and that of the resistor 113. These values are chosen so that the capacitor 114 charges to the peak point emitter voltage in a time period somewhat less than two pulse intervals wide. When the capacitor 114 does charge to the peak point emitter voltage, the UJT 112 tends to discharge the capacitor 114 to immediately drive the base 116*b* to a negative voltage turning the transistor 116 off. As the capacitor 114 cannot discharge through the base 116*b* because the transistor 116 is cut off, it must discharge through the variable resistor 115 which is set at a value so that the capacitor discharge time permits the voltage on the base 116*b* to reach a value near the turn-on value by the eleventh pulse. A free-running multivibrator is thereby formed which has unequal "on" and "off" times. The values of the resistor 113, the capacitor 114 and the variable resistor 115 are chosen so that the voltage of a junction 117 on the collector 116*c* is near the positive supply voltage for a first portion of the given time interval approximately ten pulse intervals wide and then at substantially ground potential for a second, or remaining portion of the given time interval as shown in FIGURE 4B. The output is then coupled to divider circircuit 86 through conductor 92 and through a differentiating capacitor 120 to appear on the conductor 93 as a positive spike as shown in FIGURE 4C, the negative going spikes, shown in phantom, being shunted by circuitry in monostable multivibrator circuit 84.

Synchronization of multivibrator circuit 83 with the main clock circuit 80 is obtained by coupling clock pulses to the second base 112*b*. Each clock pulse first produces a negative pulse which is immediately followed by a positive pulse. These positive pulses are coupled through the UJT 112 and the capacitor 114 to the base 116*b* when the UJT is biased on by the capacitor 114. When the capacitor 114 has discharged sufficiently to cause the base 116*b* to be near a voltage causing conduction of 116*b*, the addition of the eleventh positive pulse causes conduction of the transistor 116 at the eleventh pulse.

MONOSTABLE MULTIVIBRATOR CIRCUIT 84 AND CAPACITOR CIRCUIT 85

The monostable multivibrator circuit 84 includes an NPN transistor 121 and an NPN transistor 122; collectors 121*c* and 122*c* are resistively coupled to terminal 101 while emitters 121*e* and 122*e* are grounded. The base 121*b* is directly connected to the conductor 93 and is grounded through a diode 123 poled to conduct current to the base 121*b* so that any negative pulses from the multivibrator circuit 83 produced at the capacitor 120 are shunted to ground. A parallel circuit comprising a capacitor 124 and a resistor 125 couples the collector 121*c* to the base 122*b*. When this circuit is energized, the monostable multivibrator circuit 84 assumes a stable state with transistor 122 turned on.

The time interval during which the monostable multivibrator circuit 84 is in its astable state is controlled by the capacitor circuit 85. Assuming that a single capacitor is in the capacitor circuit 85, it can be seen that collector 122*c* is coupled through capacitor circuit 85 and a resistor 126 to a negative terminal 127 which may be connected to the negative terminal 38 shown in FIGURE 1. The terminal 127 is additionally coupled to the grounded terminal 102 by resistors 130 and 131 in series, and a diode 132 has its anode connected to the junction formed by resistors 130 and 131 and its cathode connected to a junction formed by resistor 126 and capacitor 85. In addition, this latter junction is coupled by a resistor 133 to the base 121*b* of transistor 121.

The network comprising the resistors 126, 130, 131 and 133 and diodes 123 and 132 maintains the base 121*b* at a slightly negative potential. Diode 132 is nonconductive, and the junction formed by resistors 133 and 126 is also negative. During this time, transistor 122 is conductive so that a small charge appears on the capacitor circuit 85. When a positive going spike from multivibrator circuit 83 turns on the transistor 121, the collector 121*c* goes to substantially zero thereby producing a negative going pulse which shuts off the transistor 122. The supply potential then appears at collector 122*c* and a charging current passes through capacitor circuit 85 to the resistor 133 and the base 121*b* and to the terminal 127 through the resistor 126. As a charge accumulates on capacitor circuit 85, the charging current therethrough decreases as shown in FIGURE 4G. This causes the potential at the junction formed by resistors 126 and 133 to move in a negative direction and eventually pass through zero as shown in FIGURE 4H. The base 121*b* is also taken to zero, causing the transistor 121 to shut off and a positive going pulse to appear at the base 122*b* returning the monostable multivibrator circuit to its stable state. Any remaining charge on capacitor circuit 85 is quickly removed through several discharge paths, the primary path comprising transistor 122, diode 132, resistor 131 and resistor 130. Resistors 130 and 131 are chosen to provide a rapid time constant for the discharge current to afford rapid reset.

The value of capacitor circuit 85 therefore determines the astable time interval during which the base 105*b* is at zero potential; and the transistor 105 is nonconductive. The transistor 105 is conductive and shunts pulses from the main clock circuit 80 to ground during stable operation. Specifically, the value of capacitance which characterizes capacitor circuit 85 is selected by a fourth pole 52D of the switching means 50 having a wiper arm 53D connected to collector 122*c*. In the first and twelfth pole positions, no capacitors are connected in series so that collector 122*c* is coupled to the junction formed by resistors 126 and 133 by stray capacitance. In either position the monostable multivibrator 84 assumes the astable state only momentarily; and in actuality no pulses are transmitted to the summing junction 107. In position (2) the capacitor in the circuit 85 is chosen to provide a charge time sufficient to permit a single pulse to pass to the summing junction 107. In the eleventh pole position, ten pulses pass from the main clock circuit 80 to the summing junction 107. For a given position of the switching means 50 a predetermined number of pulses are coupled to the summing junction 107 to thereby indicate the sector of the stator in which the rotor is located.

DIVIDER CIRCUIT 86

The number of pulses produced during the time interval between the eleventh pulse of one time interval and the first pulse of a succeeding interval and added to the summing junction 107 is determined by the value of the voltages at the terminals 67, 72 and 73. As noted above, the varying D-C (N) voltage across the terminals 67 and 73 is proportional to the sine of the rotor angle plus 30°. The varying D-C (D) voltage appearing across the terminals 72 and 73 is a function of the cosine of the rotor angle. The N signal is coupled to a PNP transistor 140 connected in an emitter follower circuit between terminals 101 and 102 by an emitter resistor 141 and a collector resistor 142. A current is therefore established in the resistor 141 which is substantially equal to N divided by the resistive value of the resistor 141. A voltage which is proportional to the N voltage is therefore established across the resistor 142.

The D signal is applied to a PNP transistor 143 connected in an emitter follower circuit to terminal 101 by an emitter resistor 144. The base 143*b* is energized by the D voltage, and the collector 143*c* is coupled through an NPN transistor 147 and terminal 102. A current is therefore established in the resistor 144 which is substantially equal to the D voltage divided by the resistive value of the resistor 144. Substantially this same current flows through the collector 143*c*.

In order that the voltages produced across the emitter resistors 141 and 144 are substantially equal to the N and D voltages respectively, a voltage divider circuit is connected between the terminals 101 and 102. This voltage divider network is constituted by a diode 145 and a resistor 146, the diode 145 being connected to the terminal 101 and poled for conduction. As the forward voltage drop across the diode 145 is approximately equivalent to the base-emitter voltage drop on both the transistors 140 and 143, the voltage signals appearing at the bases 140*b* and 143*b* are substantially equal to the absolute values of the N and D voltages. Therefore, the collector currents produced by both transistors 140 and 143 are directly proportional to the N and D voltages.

The transistor 147 is substantially a switching transistor, and its base 147*b* is coupled through a resistor 148 and the conductor 92 to the collector junction 117 of the multivibrator circuit 83. When the transistor 116 conducts, the base 147*b* is substantially zero so that the transistor 147 is nonconducting. During the time interval between the eleventh pulse on one cycle and the first pulse on a succeeding cycle when the transistor 116 conducts, the transistor 147 ceases conduction to permit a capacitor 150, in parallel across the collector-emitter junction of the transistor 147, to charge at a rate determined by the D voltage applied to the transistor 143.

Another NPN transistor 151 has its emitter **151*e* connected to a junction 152 formed by collector 140*c* and resistor 142. Its base 151*b* is connected to capacitor 150 while its collector 151*c* is coupled through a resistor 153 and another resistor 154 to terminal 101. The potential at the junction 152 is determined by the N voltage. The transistor 151 compares the voltage at its emitter 151*e* and the voltage across capacitor 150 which is applied to base 151*b*. The time required for the capacitor 150 to charge to a value sufficient to turn the transistor 151** on is, therefore, proportional to the *N/D* ratio. The beginning of this time period is the instant when the transistor 116 begins to conduct and the transistor 147 ceases conduction, and the end of the time period occurs when the transistor 151 just begins to conduct.

Initial conduction of transistor 151 is sensed by a high gain amplifier, shown in FIGURE 3 as comprising a plurality of transistors 156, 157 and 158. By using such a cascaded amplifier the output of the transistor 158 looks like a switching function so it is essentially nonconducting when transistor 151 is nonconducting and fully conducting when current in collector **151*c*** just begins to flow.

At the same time the base **145*b* is driven to zero by the multivibrator circuit 83, the base 160*b* of an NPN transistor 160 also goes to zero to block conduction of this transistor, the base 160*b* being coupled to the junction 117 by the conductor 92 and a resistor 161. When the transistor 160 conducts, its collector 160*c* goes to zero and biases an NPN transistor 162 off, the transistor 162 having its base 162*b* directly connected to the collector 160*c* and its collector 162*c* coupled through a resistor 163 to the collector 158*c*. When transistor 116 begins conduction, transistor 160 is turned off and NPN transistor 162** is capable of conduction.

SWITCH COMMAND CIRCUIT 87 AND RELAXATION OSCILLATOR CIRCUIT 88

The collectors **158*c* and 162*c* are coupled to the switch command circuit 87 and the relaxation oscillator circuit 88 which are constituted by two NPN transistors 164 and 165 connected in a Darlington pair with isolated collectors 164*c* and 165*c*. The collector 165*c* is coupled to terminal 102 by means of a resistor 166 and a current sensing circuit in series therewith, shown diagrammatically as a resistor 167 and a meter relay 168 constituting a one branch and a capacitor 171 constituting the other branch of a parallel circuit. When the transistor 162 is on, there is a conductive path for the base-emitter diodes of the transistors 164 and 165; a current appears in collector 165*c* to charge the capacitor 171 and energize the meter relay 168. This charging current is therefore initiated in synchronism with the eleventh clock pulse. It is terminated when the capacitor 150 charges sufficiently to initiate conduction in transistor 151. When the transistor 158 is thereby turned on, the base 164*b* is clamped to the emitter voltage so conduction of both transistors 164 and 165 is blocked. Hence the conduction time of both transistors 164 and 165** is an indication of the *N/D* ratio.

The meter relay 168 is merely shown as being illustrative of a switch command circuit because meter relays are well known in the art and are characterized by having upper and lower limit set points which control relay circuits. If the meter relay current exceeds an upper, predetermined limit, a switch actuator 170, shown diagrammatically in FIGURE 3, moves the switching means 50 in a first direction. If the current drops below a predetermined minimum, the switch actuator moves the switching means 50 in an opposite direction. If the conduction period for transistors 164 and 165 is of such a magnitude as to cause the current through collector **165*c* to be within the predetermined range, this is an indication that the switching means 50** is located in the proper sector and the conduction time is a linear time indication of the *N/D* ratio.

The relaxation oscillator circuit 88 comprises a UJT 172 having a first base **172*b*1 resistively coupled to terminal 102 and a second base 172*b*2 resistively coupled to terminal 101. In addition, the first base 172*b*1 is connected through a diode 173 to the summing junction 82. The firing circuit for the UJT 172 comprises the transistor 164 which controls the charging current for a capacitor 174 in series with a resistor 175. A junction formed by the capacitor 174 and the resistor 175 is connected to the emitter 172*e*. The UJT 172 and capacitor 174 are chosen so that capacitor 174 discharges through UJT 172 rapidly. Further there is substantially no leakage during periods of nonconduction of the UJT 172. As transistors 164 and 165 are essentially switching transistors, the charge which accumulates on capacitor 174 is a function of the time transistors 164 and 165** are conductive and this, in turn, is proportional to the *N/D* ratio. Hence, during any particular time period interval between the eleventh pulse of one cycle of operation and the first pulse of succeeding cycle of operation the capacitor 174 may discharge 0, 1 or 2 times to produce a similar number of positive going pulses which would be coupled through diode 173 to summing junction 107. If these pulses are averaged over a number of cycles of operation, the average is indicative of the position of the magnet rotor 16 within a given sector.

FIGURE 4

Figure 4:
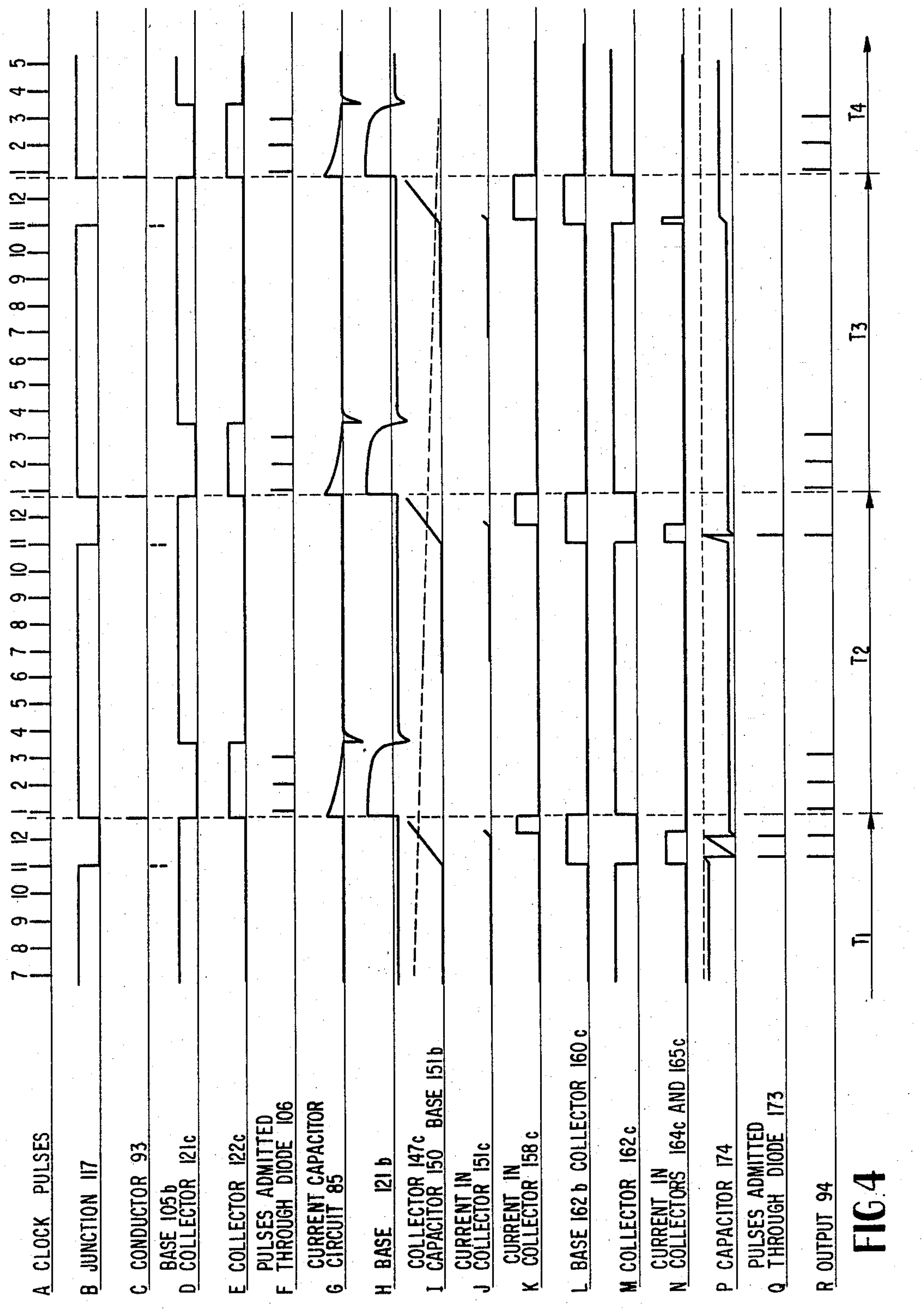
FIGURE 4 presents a time chart of the operation of the system over several cycles.

FIGURE 4 presents plots of voltage or current against time for the operations of the various elements shown in FIGURES 1 and 3 over partial time intervals $T_1$ and $T_4$ and complete time intervals $T_2$ and $T_3$ each being defined by twelve clock pulses. Each given time interval is further defined by vertical, dashed lines which are spaced at twelve pulse intervals because one complete operating cycle for the multivibrator circuit 83 occurs during each twelve pulses.

Chart 4A illustrates the clock pulses as they would appear on the conductor 90. The pulses are numbered from 1 through 12 and will be designated as pulse 1 through pulse 12 for clarity. Chart 4B represents the multivibrator output voltage at the junction 117 which is substantially at the positive supply voltage for pulses 1 through 11. With the arrival of pulse 11, the junction 117 goes to ground for the duration of the given time interval. Changes in the voltage at the junction 117 are differentiated by the capacitor 120 to produce positive voltage spikes as shown in Chart 4C. The positive voltage spikes are coupled to the monostable multivibrator circuit 84 by the conductor 93. Negative voltage spikes, shown in outline form, are bypassed through the diode 123 to ground.

The positive voltage spikes on the conductor 93 control the monostable multivibrator circuit 84 with the voltage at the collector **121*c* being shown by Chart 4D and the voltage at the collector 122*c* being shown by Chart 4E. When the collector 121*c* goes to zero as a result of a positive voltage spike being applied, the base 105*b* also goes to zero thereby permitting pulses from the main clock circuit 80 to pass through the diode 106 to the summing junction 107 as depicted by Chart 4F. The nûmber of pulses passing through the diode 106 is controlled by the capacitor circuit 85, and the charging current for the circuit is shown in Chart 4G with the voltage on the base 121*b* illustrated by the Chart 4H. When the voltage at the base 121*b* goes through zero, then the monostable multivibrator circuit 84 resumes its stable state and the gate circuit 81** closes. For purposes of the time chart, it has been assumed that the switching means is in position (4) as shown in FIGURES 1 and 3 so that three pulses are provided.

Now referring to the divider circuit 86 and the relaxation oscillator circuit 88, the conductor of the transistor 147 is controlled by the multivibrator circuit 83 and the voltage at the collector **147*c* is illustrated by Chart 4I; it is identical to the voltage on the capacitor 150. The sloped, dashed line on Chart 4I designates the base voltage required for firing the transistor 151** for a given N voltage. The time required for the capacitor to charge to such a voltage is determined by the D voltage.

It is assumed that the rotor is turning slowly during the four operating cycles shown in FIGURE 4 in order that a complete operation can be discussed. If the rotor 16 were stationary during all of the four given time intervals, the dashed line in Chart 4I would be horizontal at a height determined by the N voltage. The voltage available for charging the capacitor 150 is substantially constant as the D voltage remains relatively close to a constant value as a cosine function. The current in the collector 151*c* is shown by Chart 4J and the effect on the conduction at collector 158*c* is shown by Chart 4K. Conductor of the transistor 158 appears as a pulse because it is essentially a switching transistor.

At the same time that the transistor 147 becomes nonconductive, the base 160*b* is also driven to ground so that the potential on the collector 160*c* is increased causing the transistor 162 to conduct as shown in Charts 4L and 4M. When the transistor 162 begins conducting, the base 164*b* is biased for conduction and the transistors 164 and 165 begin conducting. Conduction is terminated when the transistor 158 is switched on at which time the transistors 164 and 165 are biased off as shown in Cart 4N viewed in conjunction with Charts 4K and 4M.

As the currents in both the collectors 164*c* and 165*c* behave in the same qualitative manner, they are both shown by Chart 4N. The voltage produced on the capacitor 171 determines the current through the meter relay 168 while the energy transferred to the capacitor 174 controls the relaxation oscillator circuits 88 as shown by Chart 4P wherein the dashed line represents the peak point voltage for the UJT 172.

As will be noted, during the period $T_1$ the *N/D* ratio is sufficient to cause the capacitor 174 to charge to the peak point voltage twice causing the capacitor 174 to discharge twice and produce the two pulses shown in Charts 4P and 4Q. A small charge remains on the capacitor 174 until the next charging period during the given time interval $T_2$ from pulse 11. The rotor 16 has now moved sufficiently to cause the capacitor 174 to charge to the peak point voltage only once so that a single output pulse is produce as shown by Chart 4Q. An additional charge is stored by the capacitor 174 until the next charging period. During the given time interval $T_3$, the *N/D* ratio has been reduced to such a value that the capacitor does not charge for a sufficient period to reach the peak point voltage. Hence, no output pulses are produced during the given time interval $T_3$ although the charge on the capacitor 174 has been increased.

Referring now to the Chart 4R, it will be seen that during the last portion of the given time interval $T_1$, two relaxation oscillator circuit output pulses were coupled to the summing junction 107. Three clock pulses and one relaxation oscillator pulse were transmitted during the given time interval $T_2$. No relaxation oscillator pulses and three clock pulses were transmitted during the given time interval $T_3$.

If the rotor 16 were to continue turning in the same direction as indicated by the Chart 4I so that the N voltage were decreasing, at some time during the given time interval $T_4$ the ratio would become such that the current through the meter relay 168 would cause the switch actuator 170 to shift the switching means 50 to an adjacent sector. In this particular case, switching means 50 would be adjusted to the third position so that on the next succeeding given time interval two clock pulses would be produced at the output terminal 94.

As noted in the initial discussion of the switching means 50, it is constituted by a four-pole, twelve-position switch. In this manner twelve sets of voltage pairs are produced so that the *N/D* ratio is sensed for an entire revolution of the rotor 16. However, the capacitor circuit 85 is constructed so that the first and twelfth contact positions have no capacitance therein so that the gate circuit 81 opens for such a short period of time that no output pulses are produced.

If the rotor 16 and the switching means 50 are not in the same sector upon initial energization, the *N/D* ratio causes the switch command circuit 87 to energize the switch actuator 170 to change the switching means 50 until the *N/D* ratio attains an acceptable value. By utilizing all twelve switch positions, this correction can be made regardless of the rotor position. However, generally only eleven sectors of the circle are utilized for actual measurements so that only ten pulses are required. This gives the time after the eleventh pulse and before the first pulse of the next succeeding cycle of the interjection of the pulses from the relaxation oscillator circuit 88. In addition, ambiguity at the 0°–360° point is eliminated.

Briefly summarizing, the signal conversion means constructed in accordance with this invention can be used to convert the output voltages of a shaft position indicating device to a digital output pulse train by initially converting the voltages from the shaft indicating device to a plurality of voltages having a fixed space phase relationship by energizing a plurality of transformers. The transformers are constructed to produce a plurality of voltages, and switching means are connected to the transformer secondaries to derive a pair of voltages therefrom having a fixed space phase relationship for a given position of the switching means. The magnitudes of the individual voltages in each voltage pair thus derived vary sinusoidally with shaft rotation. The switching means couples the voltage pair to a demodulator circuit for conversion into a pair of direct current voltages which are useful in themselves as analog voltages.

These varying direct current voltages control the number of pulses which are transferred from a main clock circuit to a summing junction and the position of the switching means. In addition, the two direct current voltages control a relaxation oscillator having its output coupled to the summing junction. Circuit means are provided to ensure that the pulses from the main clock and the relaxation oscillator do not overlap. This resulting pulse train can be fed into any device which can be energized by digital pulse inputs to produce a useful output.

The foregoing is a description of an illustrative embodiment of the invention, and it is the intention in the appended claims to cover all forms which fall within the scope of the invention.

What is claimed as new and desired to be secured by Letters Patent of the United States is:

1. A means for converting the output signals of a position indicating means for a rotatable shaft wherein the position indicating means includes a stator coil, means mounted on the shaft for producing a unique voltage pattern on the stator coil for each position of the rotating shaft and tap means on the stator coil for deriving the voltage pattern therefrom comprising:

(a) first conversion means connected to the tap means for converting the voltage pattern to a plurality of pairs of voltages having a fixed space phase relationship, the magnitude of each voltage varying with shaft position.

(b) second conversion means connected to said first conversion means for deriving therefrom a selected pair of said plurality of pairs of voltages and for converting said derived pair of voltages to a pair of direct-current analog signals indicating shaft position, (c) sensing means coupled to said second conversion means for sensing the ratio of said pair of direct-current analog signals and selecting from said plurality of pairs of voltages the pair of voltages derived by said second conversion means to maintain said ratio within a predetermined range of ratios, and (d) means connected to said second conversion means for indicating which pair of said plurality of voltage pairs produced by said first conversion means has been derived.

2. A signal conversion means as recited in claim 1 wherein said first conversion means is connected to the tap means for converting the position indicating voltages to a plurality of voltage pairs, each voltage in a given pair being in a fixed spaced phase relationship with the other voltage in said pair, the magnitudes of each voltage in said pair varying sinusoidally with a change in shaft position.

3. A signal conversion means as recited in claim 2 wherein said first conversion means comprises first and second transformers, each of said transformers having a primary and a plurality of center-tapped secondaries associated therewith, said primaries being connected to the stator coil, said secondaries being alternately connected in series in a closed loop and being poled so that the net voltage around said loop is zero.

4. A signal conversion means as recited in claim 3 wherein said secondaries are connected in a rhombic configuration having an acute angle of 60°.

5. A signal conversion means as recited in claim 3 wherein said second conversion means includes:

(i) controllable switching means connected to said first conversion means, (ii) demodulator means connected to said switching means, and (iii) voltage generating means connected to said demodulator means for producing a reference voltage for said demodulator means in time phase with said voltage pairs, said demodulator means producing one direct current signal for each voltage in the voltage pair derived by said switching means.

6. A signal conversion means as recited in claim 5 wherein said switching means includes a plurality of switch poles, each of said poles having a plurality of sequentially arranged circuit closing means connected to said transformer secondaries in said first conversion means, the individual voltages of the derived voltage pair coupled to said demodulator means by said circuit closing means being displaced a fixed space phase angle from the next derived voltage pair in the sequence.

7. A signal conversion means as recited in claim 5 wherein said sensing means includes voltage ratio detector means and a switching means actuator, said ratio detector means being responsive to excursions of said voltage ratio beyond said predetermined range to energize said switching means actuator to cause said switching means to select another pair of voltages from said second conversion means in sequence.

8. A system for converting the output signals of a position indicating means for a rotatable shaft to a digital pulse output, the position indicating means including a stator coil, means mounted on the rotatable shaft for producing a unique voltage pattern on the stator coil for each position of the rotating shaft and tap means on the stator coil for deriving the voltage pattern therefrom comprising;

(a) first conversion means connected to the tap means for converting the voltage pattern to a plurality of pairs of voltages having a fixed space phase relationship, the magnitude of each voltage varying with shaft position, (b) second conversion means connected to said first conversion means for deriving therefrom a selected pair of said plurality of pairs of voltages and for converting said derived pair of voltages to a pair of direct-current analog signals indicating shaft position, (c) sensing means coupled to said second conversion means for sensing the ratio of said pair of direct-current analog signals and selecting from said plurality of pairs of voltages the pair of voltages derived by said second conversion means to maintain said ratio within a predetermined range of ratios, (d) first pulse generating means for continuously producing pulses at a substantially constant repetition rate, (e) pulse summing means connected to said first pulse generating means to be energized by a number of pulses therefrom in a first portion of a given time interval, the number of pulses being determined by said sensing means and indicating which pair of said plurality of pairs of voltages had been derived by said second conversion means, (f) third conversion means for converting said direct-current analog voltages to a linear time interval signal indicating the shaft position, said time interval signal controlling the energization of said sensing means, and (g) second pulse generating means connected to said third conversion means for producing a pulse output dependent upon said linear time interval signal in a second portion of said given time interval, the output of said second pulse generating means being connected to said pulse summing means whereby a digital pulse output is produced at said pulse summing means during each of said given time intervals.

9. A conversion system as recited in claim 8 wherein said first conversion means comprises first and second transformers, each of said transformers having a primary and a plurality of center-tapped secondaries associated therewith, said primaries being connected to the stator coil, said secondaries being alternately connected in series in a closed loop and being poled so the net voltage around said loop is zero.

10. A conversion system as recited in claim 9 wherein said second conversion means is constituted by:

(i) controllable switching means including a plurality of switch poles, each of said poles having a plurality of sequentially selected circuit closing means connected to said transformer secondaries and means to couple a signal from each of said poles, (ii) demodulator means connected to said switching means to be energized by the signal derived from said transformer secondaries, and (iii) means for producing a reference voltage for said demodulator means in time phase with the position indicating voltages, said demodulator means producing one direct current signal for each voltages of the derived voltage pair, the individual voltages of the derived voltage pair coupled to said demodulator means by said circuit closing means being displaced a fixed space phase angle from the next derived voltage pair in the sequence.

11. A conversion system as recited in claim 10 wherein said sensing means includes voltage ratio detector means and a switching means actuator, said ratio detector means being responsive to values of said linear time interval signal beyond a predetermined range to energize said switching means actuator, said switching means actuator causing said switching means to select another pair of voltages from said first conversion means in sequence.

12. A conversion system as recited in claim 11 wherein said pulse summing means includes:

(i) a summing junction, (ii) a gate circuit controlling the number of pulses passing to said summing junction, and (iii) means responsive to the position of said switching means to open and close said gate circuit to thereby control the number of pulses passed to said summing junction from said first pulse generating means.

13. A conversion system as recited in claim 12 wherein the operation of said third conversion means is synchronized by said first pulse generator means and said position responsive means so that said third conversion means is inoperable during said first portion of said given time interval.

14. A conversion system as recited in claim 11 wherein said transformer secondaries are connected in a rhombic configuration so that the voltage pairs derived therefrom by said switching means have a constant space phase relationship, the space phase angle being equal for each voltage pair so derived.

15. A conversion system as recited in claim 14 wherein said first pulse generating means is constituted by a clock means for producing a series of pulses at a constant frequency, said pulses being coupled to said pulse summing means.

16. A conversion system as recited in claim 15 wherein said pulse summing means includes:

(i) a summing junction, (ii) a gate circuit controlling the number of pulses passing to said summing junction, and (iii) means responsive to the position of said switching means to open and close said gate circuit to thereby control the number of pulses passed to said summing junction from said clock means.

17. A conversion system as recited in claim 16 wherein said gate circuit is controlled by:

(i) a free-running asymmetrical multivibrator synchronized to said clock means to complete one operating cycle in said given time interval, said given time interval being defined by a predetermined number of pulses from said clock means, on change in the output of said multivibrator being synchronized by said pulses, and (ii) a monostable multivibrator controlled jointly by said free-running multivibrator and said sensing means, said monostable multivibrator controlling said gate circuit so that said gate circuit passes pulses only during one of the states of said monostable multivibrator.

18. A conversion system as recited in claim 16 wherein said third conversion means is constituted by a divider circuit energized by said direct current analog voltages to divide one of said direct current voltages by the other, said divider circuit producing said linear time interval signal which is a constant amplitude, variable width the pulse produced once during each cycle of operation, said variable width pulse controlling the sensing means operation and the operation of said third conversion means being controlled by the change of state of said multivibrator.

19. A conversion system as recited in claim 18 wherein said second pulse generating means is constituted by a relaxation oscillator energized by said divider circuit so that said relaxation oscillator produces output pulses in accordance with the value of the constant amplitude, variable with pulse produced by said voltage divider network.

20. A second harmonic selsyn transmitter-digital signal converter for a second harmonic selsyn transmitter including a permanent magnet connected to a rotatable shaft, a stator coil disposed about said shaft, means for energizing the coil and tap means disposed equiangularly about said stator coil, the permanent magnet producing a unique saturation pattern on the stator coil so that a unique voltage pattern is produced on the tap means for a given position of the rotatable shaft and means for converting the unique voltage pattern to a digital pulse output comprising:

(a) a voltage divider network connected across the energizing means having terminals formed thereon so that the voltage division at each of the terminals corresponds to the voltage division across the tap means on the stator coil, (b) first and second transformers, each of said transformers having a single primary and a pair of center-tapped secondaries associated therewith, said primaries being connected between one of the terminals on said voltage divider network and a corresponding tap means on the stator coil so that each of said primaries is energized by a signal which is substantially the second harmonic of the frequency supplied by the energizing means, said secondaries being alternately connected in series in a closed rhombic loop and being poled so that net voltage around said loop is zero, (c) full-wave regulated rectifying means connected to the energizing means and phase shift network means energized by the second harmonic output of said rectifying means, said phase shift network means providing a second harmonic reference voltage in time phase with the voltage energizing said transformer primaries, (d) switching means including a plurality of poles, each of said poles having a plurality of sequentially selected circuit closing means individually connected to said transformer secondaries, and means on each of said poles for deriving from said electrical closing means a pair of voltages having a fixed space phase relationship, the individual voltages of the derived pair being displaced a fixed space phase angle from the next derived voltage pair in sequence, the magnitudes of said individual voltages both varying during switching and individually varying sinusoidally with changes in shaft position, (e) first and second demodulator means connected to said switching means to be individually energized by one of said voltages in said derived voltage pair, each of said demodulator means additionally being energized by said rectifying means and phase shift network means so that a pair of direct current analog voltages are derived from said demodulator means, (f) clock means for producing a series of pulses at a constant frequency, a predetermined number of pulses defining a given time interval, (g) a free-running asymmetrical multivibrator synchronized by pulses from said clock means, said free-running multivibrator completing an operating cycle in said given time interval, (h) a monostable multivibrator connected to said switching means and to said free-running multivibrator, the changes between the stable and astable states being controlled by said free-running multivibrator and by said switching means, (i) a gate circuit means connected to said monostable multivibrator and to said clock means to pass a predetermined number of pulses from said clock means during a first portion of said given time interval, the number of pulses being passed controlled by said monostable multivibrator and indicating which of said pair of voltages produced by said transformers has been derived, (j) pulse summing means connected to the output of said gate circuit means to be energized by pulses passed by said gate circuit means, (k) a second divider circuit adapted to be energized by said pair of direct current analog voltages, to divide one of said direct current voltages by the other, (l) voltage ratio detector means connected to said divider circuit, said divider circuit additionally being connected to said free-running multivibrator to be operable only when said monostable multivibrator is in one state, said divider circuit producing a constant amplitude, variable width pulse output which is sensed by said voltage ratio detector means, said variable width pulse output being a linear time interval signal to indicate the ratio of said direct current analog voltages, (m) switch actuator means energized by said voltage ratio detector means when said ratio goes outside a predetermined ratio range to change said switching means to an adjacent position to thereby derive another voltage pair from said transformer secondaries, and (n) second pulse generating means connected to said divider circuit for producing a pulse output dependent upon the value of said linear time interval signal during a second portion of said given time interval, the output of said second pulse generating means being connected to said pulse summing circuit whereby a digital pulse output is produced at said pulse summing means during each of said given time intervals.

21. A second harmonic selsyn transmitter-digital converter as recited in claim 20 wherein said switching means includes means for controlling the time said monostable multivibrator is in said one state in accordance with the particular derived voltage pair, the time during which said monostable multivibrator is in said one state always being less than said given time interval.

22. A second harmonic selsyn transmitter-digital converter as recited in claim 20 additionally including control means for blocking operation of said divider circuit, said control means being connected to said free-running multivibrator to block operation of said divider circuit when the monostable multivibrator is in said one state.

23. A second harmonic selsyn transmitter-digital converter as recited in claim 20 wherein said second pulse generating means is constituted by a unijunction transistor relaxation oscillator circuit connected to said divider circuit to be energized by said linear time interval signal only when said monostable multivibrator is in said one state.

References Cited

UNITED STATES PATENTS

| | | | |
|---|---|---|---|
| 3,023,959 | 3/1962 | Rabin et al. | 235—154 |
| 3,277,461 | 10/1966 | Selvin | 340—347 |
| 3,375,508 | 3/1968 | Molnar | 340—198 |

MAYNARD R. WILBUR, Primary Examiner

M. K. WOLENSKY, Assistant Examiner

U.S. Cl. X.R.

340—198